United States Patent
Baker (10) Patent No.: US 10,119,672 B2
(45) Date of Patent: Nov. 6, 2018

(54) BUNDLE ENTRY WEAVE FOR LIGHTING MODULES

(71) Applicant: VALEO NORTH AMERICA, INC., Troy, MI (US)

(72) Inventor: Patton Davis Baker, Seymour, IN (US)

(73) Assignee: VALEO NORTH AMERICA, INC., Troy, MI (US)

( * ) Notice: Subject to any disclaimer, the term of this patent is extended or adjusted under 35 U.S.C. 154(b) by 24 days.

(21) Appl. No.: 15/335,676

(22) Filed: Oct. 27, 2016

(65) Prior Publication Data

US 2018/0119919 A1 May 3, 2018

(51) Int. Cl.
| | |
|---|---|
| *B60Q 1/34* | (2006.01) |
| *F21V 8/00* | (2006.01) |
| *F21S 43/236* | (2018.01) |
| *F21S 43/50* | (2018.01) |
| *G02B 6/36* | (2006.01) |

(52) U.S. Cl.
CPC ............ *F21S 43/236* (2018.01); *B60Q 1/34* (2013.01); *F21S 43/50* (2018.01); *G02B 6/0006* (2013.01); *G02B 6/0086* (2013.01); *G02B 6/3604* (2013.01); *G02B 6/3608* (2013.01); *G02B 6/001* (2013.01); *G02B 6/0028* (2013.01)

(58) Field of Classification Search
CPC .... F21S 43/235; F21S 43/236; G02B 6/0006; G02B 6/001; G02B 6/0086; G02B 6/0088; G02B 6/3504; G02B 6/3604; G02B 6/3628

See application file for complete search history.

(56) References Cited

U.S. PATENT DOCUMENTS

| | | | | |
|---|---|---|---|---|
| 4,885,663 | A * | 12/1989 | Parker ................... | G02B 6/001 362/330 |
| 4,907,132 | A * | 3/1990 | Parker ................... | D03D 15/00 362/556 |
| 7,319,426 | B2 * | 1/2008 | Garfio ................. | H01H 9/0235 341/173 |
| 7,401,964 | B2 * | 7/2008 | Haenen ................ | G02B 6/0048 362/554 |
| 7,556,412 | B2 * | 7/2009 | Guillermo .............. | A42B 3/044 362/551 |
| 8,702,291 | B2 * | 4/2014 | Stephan ............... | G02B 6/0008 362/259 |
| 2017/0217366 | A1 * | 8/2017 | Kraemer ................. | B60Q 3/64 |

FOREIGN PATENT DOCUMENTS

FR    2715714 A1 *  8/1995    ........... G02B 6/0008

OTHER PUBLICATIONS

Le Gars, Jan. 28, 1994, Patent Translate Powered by EPO and Google, Description FR2715714, pp. 1-4.*
Le Gars, Jan. 28, 1994, Patent Translate Powered by EPO and Google, Claims FR2715714, p. 1.*

* cited by examiner

*Primary Examiner* — Alan Cariaso
(74) *Attorney, Agent, or Firm* — Oblon, McClelland, Maier & Neustadt, L.L.P.

(57) ABSTRACT

A fiber optic lighting module is disclosed that includes a set of fiber optic light panels wherein the optical fibers extending from a first fiber panel are interwoven with the optical fibers extending from a second fiber panel.

20 Claims, 6 Drawing Sheets

BUNDLE ENTRY WEAVE FOR LIGHTING MODULES

BACKGROUND

Technical Field

This disclosure relates to lighting modules, and more particularly to an apparatus that includes an interwoven set of fiber optic light panels and a method for manufacturing the same.

Background

Motor vehicles contain numerous lighting devices for both interior and exterior illumination. For example, exterior vehicle lighting devices may perform stop light functions, taillight functions, headlamp functions, daytime running light functions, dynamic bending light functions, and fog light functions.

In an effort to improve vehicle and pedestrian safety, most governments promulgate some form of safety regulations that specify motor vehicle lighting performance requirements that ensure adequate illumination of the roadway and enhance the visibility of motor vehicles on the roads so that their presence is perceived and their signals understood in daylight, in darkness, and in conditions of reduced visibility. For example, at the date of this filing, Federal Motor Vehicle Safety Standards (FMVSS) No. 108 specifies, with reference to standards from SAE International, a minimum luminous intensity for vehicle turn signals and stop lamps (i.e. brake lights) on vehicles operated within the Unites States. Vehicle manufacturers must design vehicle lighting devices to meet the technical requirements of these or similar standards around the world. In recent years, vehicle lighting has also become important for its aesthetic appeal to consumers. Thus, vehicle manufacturers have made an effort to design vehicle lighting devices in consideration of the styling of the vehicle on which the lighting devices are mounted. Further, vehicle manufacturers may provide optional lighting effects (in addition to the required lighting functionality) to enhance vehicle styling.

It may be technically challenging to provide aesthetically appealing vehicle lighting devices while also meeting the necessary cost, technical, and regulatory requirements. For example, headlamps and taillights on currently manufactured cars and trucks typically use significant power and require various additional components such as reflectors, lenses, cut off devices, and the like. Aesthetic lighting effects lead to an even greater number of components and complexity. Such vehicle lighting devices often are not easily adapted to the styling of the vehicle.

Recently, a number of vehicle manufacturers have been experimenting with the use of thin organic light-emitting diode (OLED) panels in an effort to meet desired lighting and aesthetic characteristics of vehicle lighting. For some applications, OLED panels may be formed into three-dimensional shapes. Fiber panel LEDs (typically driven by inorganic light-emitting diodes) may have a similar form to OLED panels. For example, U.S. Pat. No. 6,874,925 discloses fiber optic light emitting panel assemblies. However, these assemblies have generally been limited to electronics backlighting, surgical devices, phototherapy and other applications not subject to the technical requirements of vehicle lighting.

The "background" description provided herein is for the purpose of generally presenting the context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY

It is an object to provide an interwoven set of fiber optic light panels to reduce a separation distance between closely positioned panels.

It is another object to provide a set of fiber optic light panels that can meet the technical and aesthetic requirements for vehicle lighting.

Another object to provide a set of fiber optic light panels that can conform to the styling of a vehicle.

Yet another object is to provide a set of fiber optic light panels that provides desired lighting effects to enhance aesthetics of the vehicle design.

Still another object is to provide a set of fiber optic light panels as a lower cost alternative to OLED panel lighting devices.

Another object is to provide a set of fiber optic light panels as a more reliable alternative to OLED panel lighting devices.

These and/or other objects may be provided by embodiments of the invention disclosed herein. In some embodiments, two fiber optic light panels, each having a light source and a plurality of optical fibers are woven together. In each fiber optic light module, the plurality of optical fibers are bundled at one end to receive light from the light source, and may be adhered together and/or to a back plate to form a light-emitting panel at the other end. The optical fibers of the two panels may be interwoven to reduce a separation distance between the two panels when they are positioned closely to one another.

The bundling element can include a ferrule configured to hold the plurality of fibers in a bundle having a predetermined cross-sectional shape. The bundling element can also include adhesive configured to hold the plurality of fibers in the predetermined cross-sectional shape.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

In the Drawings.

DETAILED DESCRIPTION

Fiber optic light panels have previously been used as backlighting for displays and other electronics devices. U.S. patent application serial no. PCT/US2015/036629 (unpublished) titled Fiber Optic Lighting and/or Signaling System for a Vehicle, filed on Jun. 19, 2015 by the same Applicant as the present application, discloses a fiber optic light panel device for exterior lighting of vehicles. The entire contents of this application are incorporated herein by reference.

A fiber optic light panel assembly generally includes a light source that inputs light to a fiber bundle having fibers extending therefrom to form a light panel. The present inventors have recognized a need to combine such fiber optic panels into a module that meets a particular desired aesthetic, while meeting all technical and regulatory requirements. The inventors further recognized that mounting two or more fiber optic light panels close together may present a particular challenge when the abutting edges of the panels are the edges fed from the source of illumination.

Figure 1:
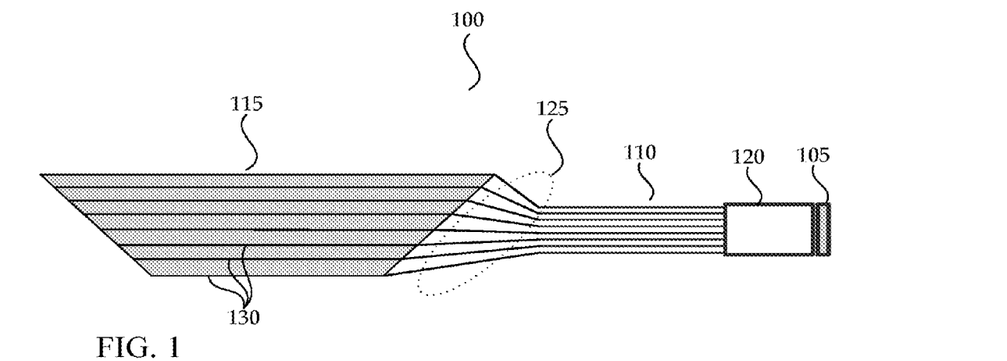
FIG. 1 is a schematic representation of a fiber optic light panel device.

FIG. 1 is a schematic representation of a fiber optic light panel assembly. The fiber optic light panel assembly 100 may include a light source 105, a fiber bundle 110, and a fiber panel 115. The fiber bundle 110 may include a large number of glass or plastic optical fibers and can be bound together at one end by bundling element 120. Bundling element 120 may be formed from a brass or plastic ferrule, cable tie, tape, adhesive, or other material that may serve to hold fiber bundle 110 into a nominally cylindrical shape. Additional bundling elements may be used along fiber bundle 110 to keep the optical fibers close together. The light generated by light source 105 may be coupled to fiber bundle 110 for transmission to fiber panel 115, which emits light from a surface thereof to produce a desired lighting function. Additional optical elements may be positioned between light source 105 and fiber bundle 110 for the purpose of focusing, distributing, or otherwise guiding the light from light source 105 into fiber bundle 110. Transition region 125 provides a transition from the nominally cylindrical fiber bundle 110 to the nominally flat profile desired to form optical fibers 130 into fiber panel 115. In the drawings, only a small number of optical fibers 130 are shown for simplicity. Fiber optic light panel assemblies of the type described herein may include from several tens of fibers to thousands of fibers. In addition, the schematic representation of FIG. 1 appears to show a single layer of optical fibers 130 in fiber panel 115. It should be understood that fiber panel 115 may be formed by more than one layer of optical fibers.

Optical fibers 130 in fiber panel 115 are arranged such that they define a generally planar and generally trapezoidal or rectangular form, although fiber panel 115 may be any other geometric shape (square, triangular, arcuate, etc.) that meets the aesthetic and technical requirements of a particular application. In addition, fiber panel 115 may be pliable and flexible or may be formed into a three-dimensional surface that meets the aesthetic and technical requirements of a particular application. Fiber panel 115 may be adapted to be housed in a support or frame which may define the three-dimensional surface.

Optical fibers 130 within fiber panel 115 can be arranged in a generally parallel relationship with respect to one another and with respect to a longitudinal axis of fiber panel 115. However, it should be understood that optical fibers 130 may assume similar or different positions (e.g., parallel, non-parallel, curved, arcuate or serpentine). For example, some of optical fibers 130 may be straight while others are not. Further, although optical fibers 130 are shown extending along the entire length of fiber panel 115, some or all of optical fibers 130 could extend less than the entire length. Also, optical fibers 130 may have different sizes or dimensions, such as different diameters. Thus, optical fibers 130 can be different shapes, dimensions and sizes and are adapted and arranged in the predetermined form depending on the light pattern or lighting function desired.

It should be understood that fiber panel 115 may include any number of optical fibers 130 depending on the environment in which they are to be used. In some applications, there can be approximately fifty (50) fibers of 0.23 mm diameter per fiber panel 115, or 100 fibers per inch. Clearly, other numbers and sizes of optical fibers 130 could be used.

Light source 105 may be any suitable light emitter having appropriate photometric characteristics to provide a desired light output from fiber panel 115. For example, light source 105 may provide any particular radiation pattern of suitable flux, wavelength and intensity to satisfy the lighting requirements and/or aesthetic lighting effects of fiber panel 115.

Light source 105 may include one or more light emitting devices or solid state light sources. The term "solid state" generally refers to light emitted by solid-state electroluminescence, as distinct from light emitted by a source of incandescence or fluorescence. For example, light source 105 may include an inorganic semiconductor light emitting diode (LED) or laser diode, an organic light emitting diode (OLED), polymer light emitting diode (PLED), an LED lamp package, LED chip or LED die, or an array of one or more of these devices. Where a plurality of LEDs is used, they can be the same or different colors. It should be understood that light source 105 could be multiple discrete LEDs or an LED light bar. In an embodiment, light source 105 may be an LED providing approximately 2 W, 140 lm output at 2.65 Volts. and 750 mA of current. Alternatively, 860 mA, 6.29 V, 510 lm white 1×2 LED source may be provided light source 105. A halogen and/or high-intensity discharge (HID) source may also be used for light source 105.

Figure 2:
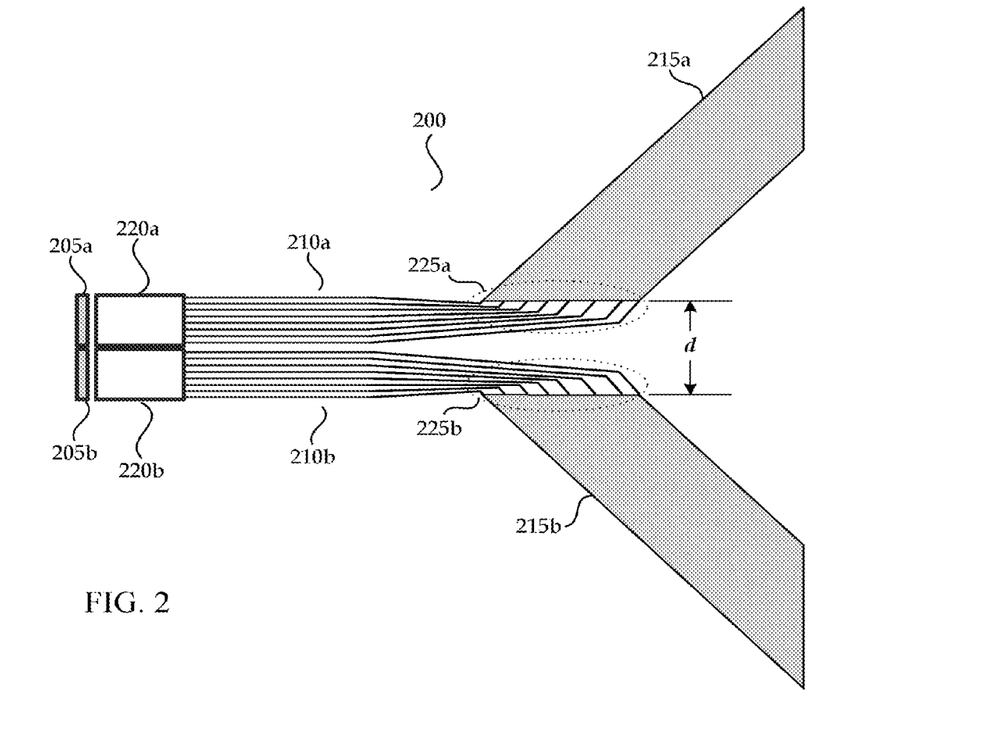
FIG. 2 is a schematic representation of a lighting module.

FIG. 2 illustrates a schematic representation of a fiber optic lighting module. Fiber optic lighting module 200 may include two fiber optic light panel assemblies like that illustrated in FIG. 1, wherein the two fiber panels are configured to form a "V" or arrowhead shape.

In FIG. 2, fiber optic lighting module 200 includes two light sources 205a and 205b, two fiber bundles 210a and 210b, and two fiber panels 215a and 215b. As discussed above, fiber bundles 210a and 210b may each include a large number of glass or plastic optical fibers and can be bound together at one end by bundling elements 220a and 220b. Bundling element 220a and 220b may be formed from brass, plastic, tape, or other material that may serve to hold fiber bundles 210a and 210b into a nominally cylindrical shape. As with the fiber optic light panel assembly 100 of FIG. 1, the light generated by light sources 205a and 205b may be coupled to corresponding fiber bundles 210a and 210b for transmission to corresponding fiber panels 215a and 215b, each of which emits light from a surface thereof to produce a desired lighting function. As illustrated in FIG. 2, fiber panels 215a and 215b may be arranged to be adjacent to one another. The inventors of the instant application recognized that this arrangement may be desirable in some automotive lighting applications due to a natural bias of the light output of a fiber panel, such as fiber panels 215a and 215b, as will be discussed further below. Transition regions 225a and 225b provide a transition from the nominally cylindrical fiber bundles 210a and 210b to the nominally flat profiles desired to form the optical fibers as fiber panels 215a and 215b.

Referring to FIG. 2, it can be seen that a distance d between the two fiber panels 215a and 215b must be allowed for the optical fiber transition regions 225a and 225b. If the distance d between the two fiber panels 215a and 215b is too small (below about 10-12 mm in the implementation illustrated in FIG. 2), the required bend of the optical fibers in transition regions 225a and 225b may be too sharp. As those skilled in the art will recognize, if an optical fiber is bent below a minimum bend radius, significant loss of light will occur at the bend. In some cases, bending beyond a minimum bend radius can break or otherwise damage an optical fiber. The minimum bend radius of a particular optical fiber depends on the construction of the fiber, and may be in the range of 10 to 50 times the diameter of the fiber. For example, if the optical fiber has a diameter of 0.2 mm and the minimum bend radius is 20 times the diameter of the fiber, then the minimum bend radius of the fiber is 4.0 mm.

In some applications, the distance d between the two fiber panels 215a and 215b may be reduced to a point where the two fiber panels 215a and 215b are nearly touching, such that fiber panels 215a and 215b appear to be a single continuous lighting element. For example, some applications may require the edges of the panels to be within 2-3 mm of one another, or less, to reduce or eliminate the appearance of a dark region at the interface between the two panels. In such an application, there is a need to "dress" the optical fibers in transition regions 225a and 225b to avoid bending the fibers below their minimum bend radius.

Figure 3:
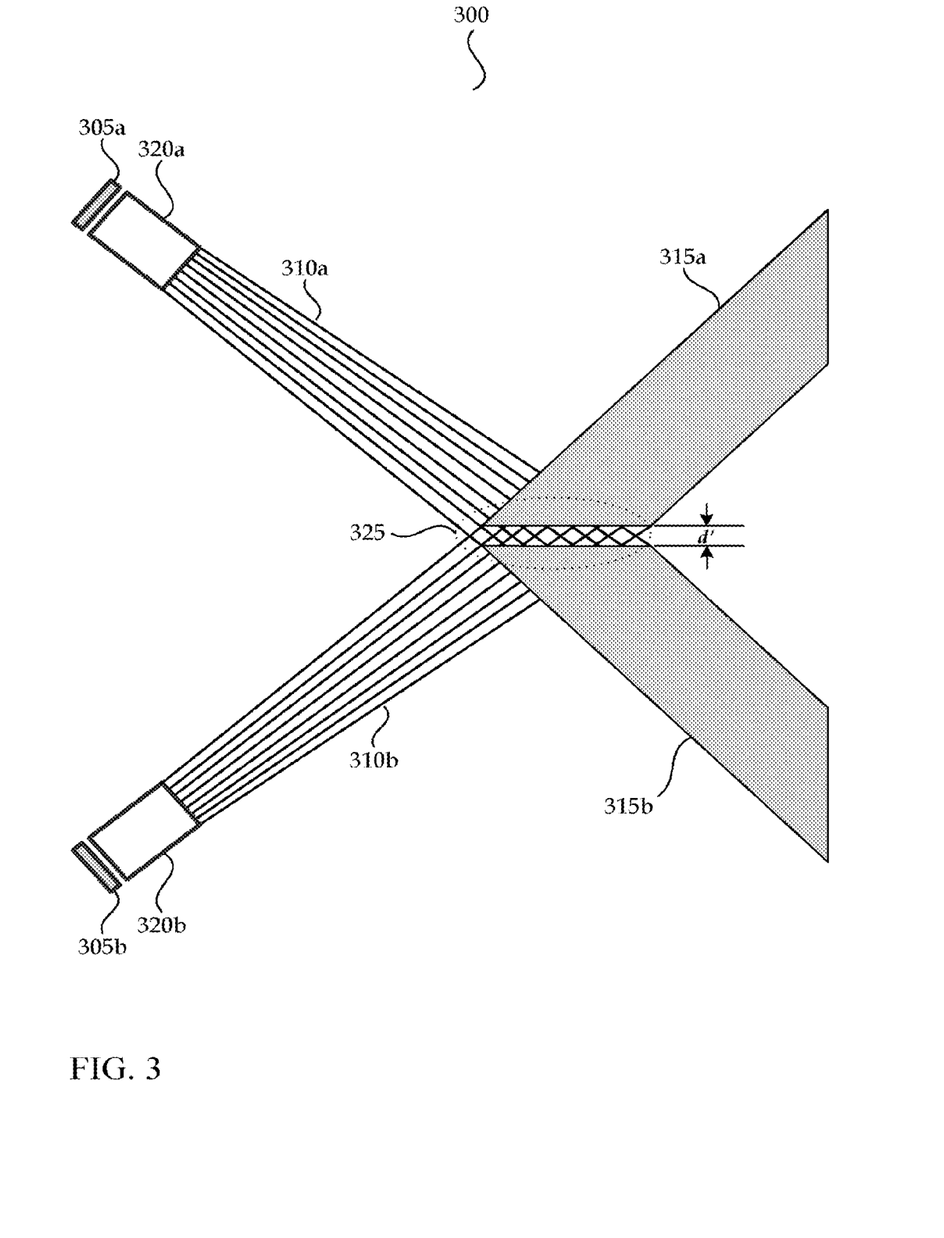
FIG. 3 is a schematic representation of another lighting module.

FIG. 3 illustrates a schematic representation of a fiber optic lighting module that allows for a smaller distance d' between panels than the implementation illustrated in FIG. 2. In FIG. 3, fiber optic lighting module 300 may include two fiber optic light panel assemblies like that illustrated in FIG. 1, wherein the two fiber panels are configured to form a "V" or arrowhead shape. In FIG. 3, fiber optic lighting module 300 includes two light sources 305a and 305b, two fiber bundles 310a and 310b, and two fiber panels 315a and 315b. Again, fiber bundles 310a and 310b may each include a large number of glass or plastic optical fibers and can be bound together at one end by bundling elements 320a and 320b. Bundling elements 320a and 320b may be formed from brass, plastic, tape, or other material that may serve to hold fiber bundles 310a and 310b into a nominally cylindrical shape. As with the fiber optic light panel assembly 100 of FIG. 1, the light generated by sources 305a and 305b may be coupled to corresponding fiber bundles 310a and 310b for transmission to corresponding fiber panels 315a and 315b, each of which emits light from a surface thereof to produce a desired lighting function. Transition region 325 provides a transition from the nominally cylindrical fiber bundles 310a and 310b to the nominally flat profiles desired to form the optical fibers as fiber panels 315a and 315b.

Figure 4:
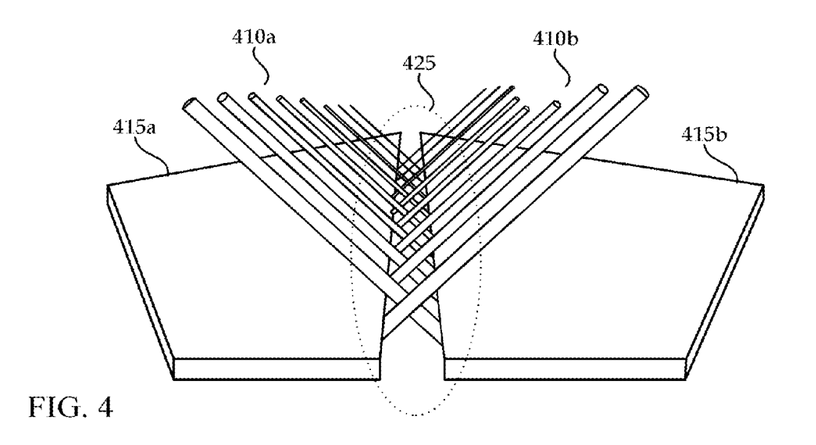
FIG. 4 is a perspective schematic view from the back of a lighting module.

FIG. 4 is a perspective schematic view from the back of a fiber optic lighting module like that illustrated in FIG. 3. As illustrated in FIG. 4, optical fibers from each fiber bundle 410a and 410b are interwoven as they enter transition region 425. The interweaving of optical fibers in this way allows fiber panels 415a and 415b to be placed much closer to one another than would be possible with the implementation illustrated in FIG. 2. In some implementations, for example, fiber bundles 410a and 410b and fiber panels 415a and 415b may be positioned such that fiber panels 415a and 415b appear to emit light from a single continuous panel. While FIG. 4 illustrates a small number of interwoven optical fibers for clarity, it will be clear that any number of optical fibers may be interwoven as illustrated. In addition, the strict and precise interweaving of optical fibers illustrated in FIG. 4, where each fiber from fiber bundle 410a is interwoven with a single fiber from fiber bundle 410b, may be relaxed without losing the benefits of the interweaving itself. For example, the fibers from fiber bundle 410a may be assembled into groups of two or more and interwoven with similar groups from fiber bundle 410b.

Generally, optical fibers can be used to transmit light from one end of a fiber to the other end. This mode of operation, depending on total internal reflection (TIR), is well known in the art, and may be used for optical communication or lighting. Alternatively, optical fibers may be treated to emit light from the surface of the fibers over a predetermined span. The alteration of optical fibers for the purpose of surface emission may involve grinding or abrading the surface of the fibers to produce regular or random surface features that allow some of the transmitted light to escape from the core of the optical fibers.

Figure 5:
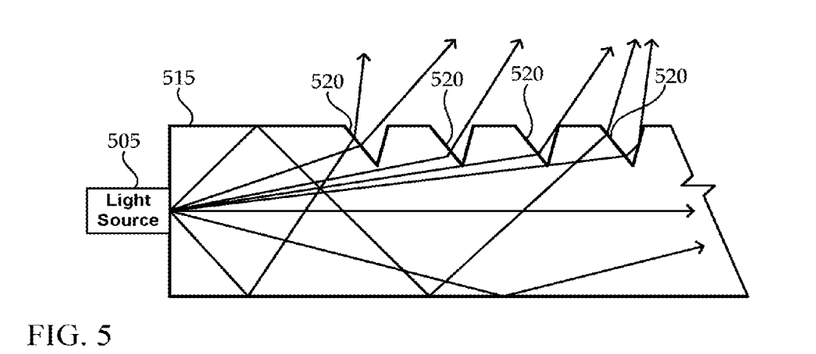
FIG. 5 is a schematic representation of a portion of an optical fiber.

FIG. 5 is a schematic representation of a portion of an optical fiber that that has been treated to emit light from the surface of the fiber and that may be used in a fiber optic lighting module as illustrated in FIGS. 3 and 4. In FIG. 5, optical fiber 515 is greatly enlarged to show features of the fiber. Light source 505 emits light into the left end of optical fiber 515. Optical fiber 515 has been treated to produce surface features 520 that allow some of the light from light source 505 to escape along the surface of the fiber. Surface features 520 are illustrative only and not intended to show precise geometry, size, location, or regularity. As can be seen in FIG. 5, some light rays from light source 505 impinge on surface features 520 and, through reflection or refraction, leave the surface of optical fiber 515. Depending on the exact geometry, size, and location of surface features 520, light may exit the fiber from the same side as surface features 520, or from the opposite side of the fiber.

Figure 6:
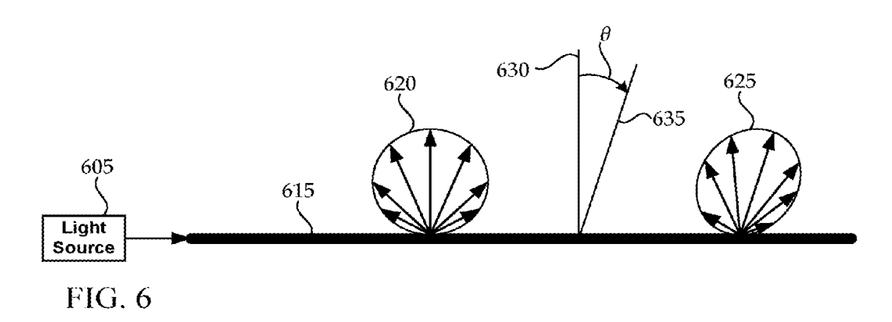
FIG. 6 is a another schematic representation of a portion of an optical fiber.

FIG. 6 is another schematic representation of a portion of an optical fiber that may be used in a fiber optic lighting module as illustrated in FIGS. 3 and 4. Light source 605 emits light into the left end of surface emitting optical fiber 615. Surface emitting optical fiber 615 may be treated to allow some of the light from light source 605 to escape along the surface of the fiber. Light distribution pattern 620 illustrates one possible distribution of light emitted from each point on the surface of surface emitting optical fiber 615. Distribution pattern 620 is an approximation of the well-known Lambertian distribution pattern of an ideal diffuse emitter, where the luminous intensity is directly proportional to the cosine of the angle between the direction of the emitted light and a direction normal to the emitter surface. As can be seen, the peak luminous intensity is in a normal direction 630 to the surface of surface emitting optical fiber 615. An alternative light distribution pattern 625 may be found in some implementations of surface emitting optical fiber 615. In light distribution pattern 625, the peak luminous intensity is tilted by an angle θ 635 from the normal. In some applications, the angle θ may be in the range of 20-35 degrees. This may be considered a "natural bias" of surface emitting optical fiber 615 (and a fiber panel that includes such optical fibers) due to the specific pattern or type of surface features used to produce emission from the surface of surface emitting optical fiber 615. Interwoven sets of fiber optic light panels, like those illustrated in FIGS. 3 and 4, may be used to provide light input at the abutting edges of the fiber panels to capitalize on the natural bias of a panel in a particular automotive application.

Figure 7:
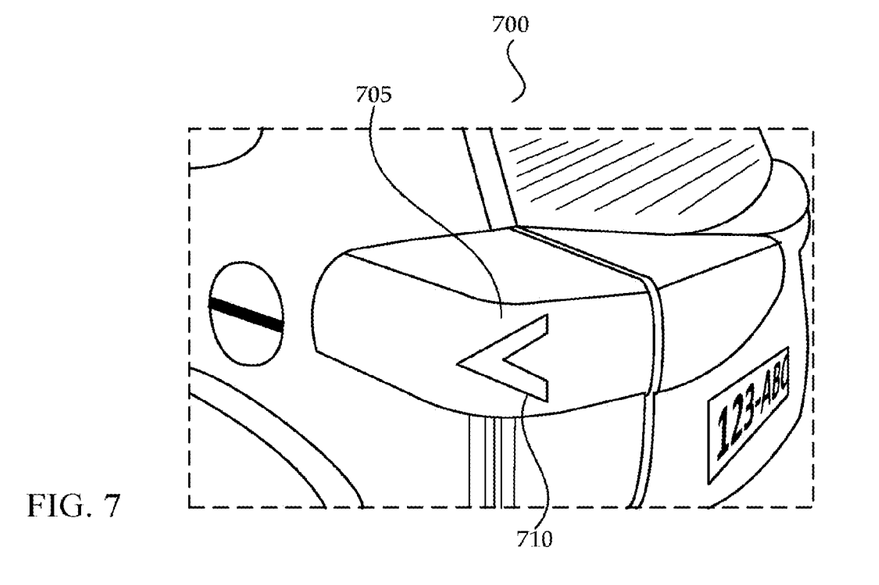
FIG. 7 illustrates an example application for the fiber optic lighting module.

FIG. 7 illustrates an example application for a fiber optic lighting module. FIG. 7 shows a view 700 of the left rear taillight assembly and surrounding area of a vehicle. Taillight assembly 705 may include one or more fiber optic lighting modules 710. Fiber optic lighting module 710 may be positioned at an angled corner of taillight assembly 705 or may be fabricated to conform to the curvature of a corner of taillight assembly 705. In either case, fiber optic lighting module 710 may be positioned to be visible from both the rear and the side of a vehicle.

Figure 8:
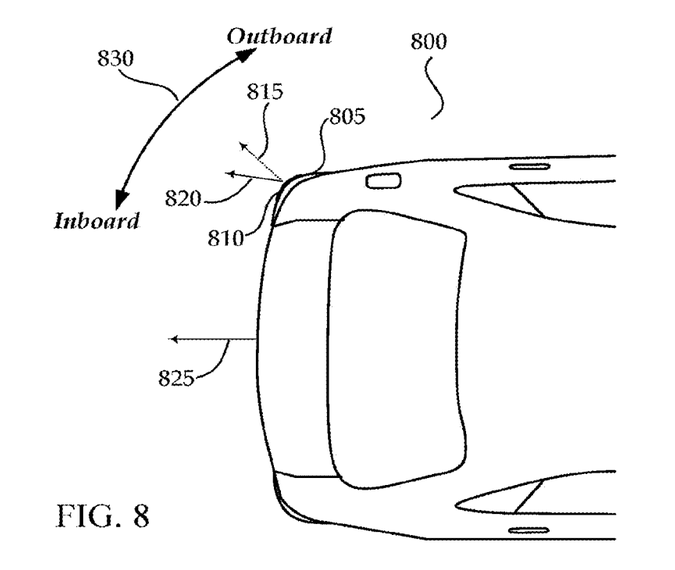
FIG. 8 illustrates another example application for the fiber optic lighting module.

FIG. 8 illustrates another example application for a fiber optic lighting module. In FIG. 8, a top view schematic 800 of the rear section of a vehicle is shown. Taillight assembly 805 may include one or more fiber optic lighting modules 810. Fiber optic lighting module 810 may be positioned similar to that shown for module 710 as illustrated in FIG. 7 at an angled corner of taillight assembly 805 or may be fabricated to conform to the curvature of a corner of taillight assembly 805. In FIG. 8, light emitted from fiber optic lighting module 810 may have a peak luminous intensity in a direction 815 that is generally normal to the surface of fiber optic lighting module 810, or may have a peak luminous intensity biased in a direction 820 to the surface of fiber optic lighting module 810 as noted above. In some embodiments, direction 820 may be in the range of 20-35 degrees from the normal direction 815. The orientation of fiber optic lighting module 810 may provide superior performance to alternative configurations where the light sources may be positioned at alternate locations to that illustrated in FIGS. 2 and 3. It should be understood that a preferred direction of light from fiber optic lighting module 810 may be normal to the rear of the car (direction 825) based on regulatory requirements for this lighting module's function and may vary depending on the function. With this greater degree of freedom in placement, the light source and the natural bias of the emitted light, it is important to place the source of light in a location such that the natural bias aids in directing the light close to direction 825. For reference purposes, FIG. 8 includes an orientation indicator 830, which shows the directions referred to as "Outboard" (toward the side of the vehicle), and "Inboard" (toward the centerline of the vehicle). In the implementation discussed above with respect to FIG. 8, the light sources for fiber optic lighting module 810 may be positioned in taillight assembly 805 near the Outboard end of taillight assembly 805 to direct their light output toward the Inboard end of taillight assembly 805. Interwoven sets of fiber optic light panels may provide a greater degree of freedom in placement of the light source with respect to the adjacent panel ends.

Figure 9A:
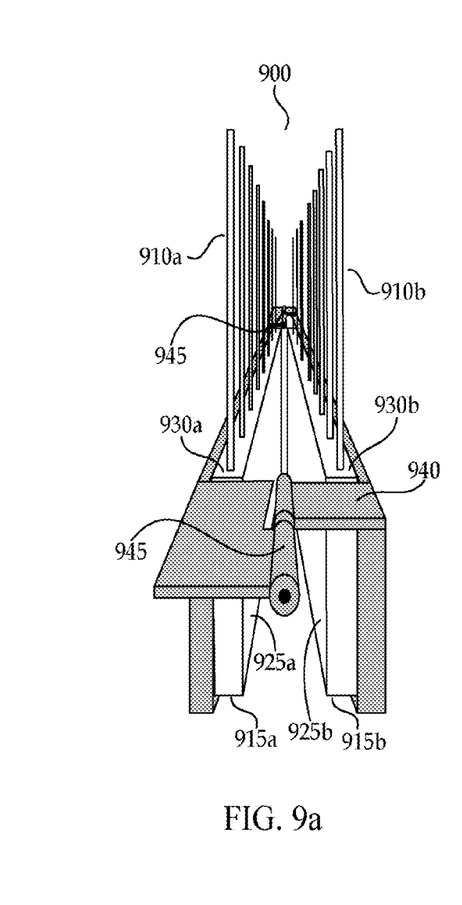
FIG. 9a illustrates a step in a manufacturing method for assembling a fiber optic lighting module.
Figure 9B:
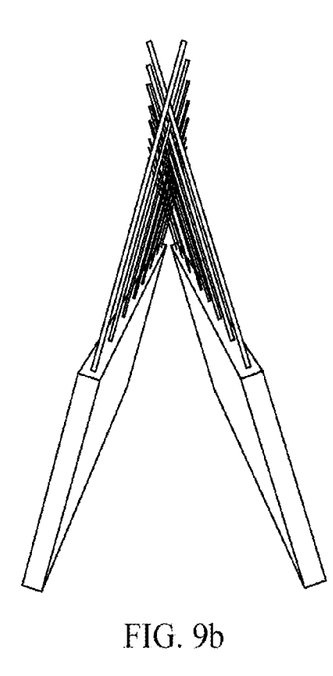
FIG. 9b illustrate another step in a manufacturing method for assembling a fiber optic lighting module.
Figure 9C:
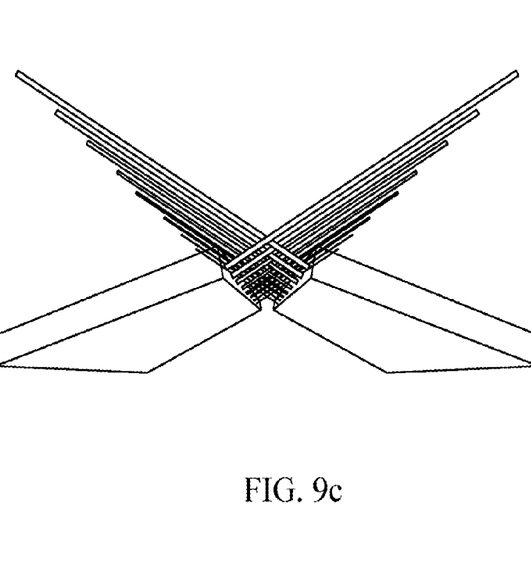
FIG. 9c illustrates yet another step in a manufacturing method for assembling a fiber optic lighting module.

FIGS. 9a, 9b, and 9c illustrate a number of steps in a manufacturing method for assembling a fiber optic lighting module 900. For the purpose of this description, it should be noted that a fiber panel has a primary emitting surface (a front face) and a back face. The back face of a fiber panel may have diminished light emission (or no emission) as compared to the front face. FIG. 9a shows two fiber panels 915a and 915b placed face-to-face with the front face 925a of fiber panel 915a facing the front face 925b of fiber panel 915b. The front faces 925a and 925b and edges 930a and 930b of fiber panels 915a and 915b are aligned to be parallel and in close proximity. For example, fiber panels 915a and 915b may be placed within 5 mm of one another. More preferably, fiber panels 915a and 915b may be placed within 2 mm of one another. As illustrated in FIG. 9a, Fiber panels 915a and 915b may be mounted in a hinged fixture 940 that allows the fiber panels to be unfolded along a hinge line created by hinge 945 that is parallel and in close proximity to edges 930a and 930b. Fiber panels 915a and 915b may then be unfolded alone the hinge line. Note that the hinged fixture 940 has been removed from FIGS. 9b and 9c for clarity. During the unfolding step, the optical fibers 910a and 910b from fiber panels 915a and 915b interweave with one another. In some embodiments, the interweaving process is aided by vibrating the entire hinged fixture 940 and/or by vibrating fiber panel 915a with respect to fiber panel 915b. In other embodiments, a comb structure may be interposed between the groups of optical fibers to facilitate the interweaving process. FIGS. 9b and 9c show steps in the unfolding process.

Figure 10:
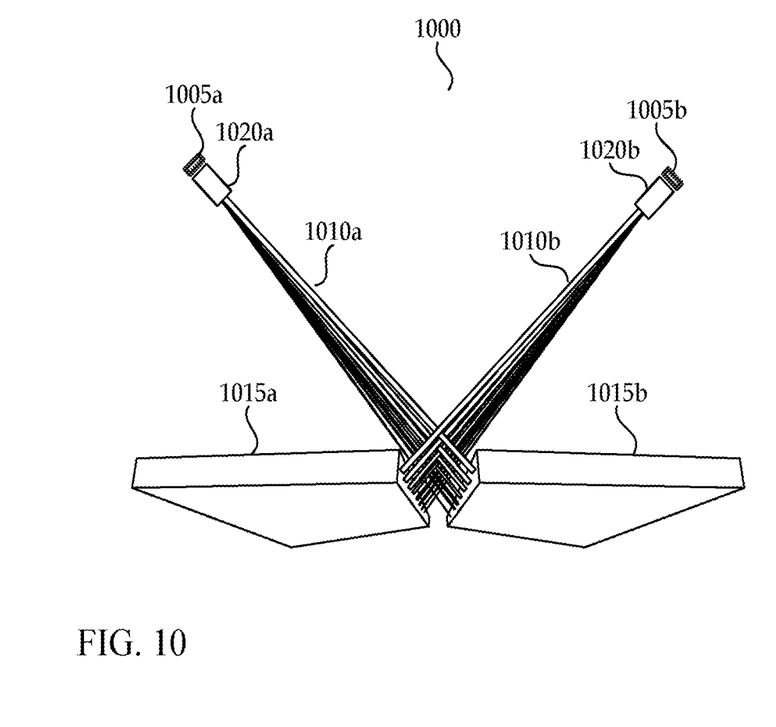
FIG. 10 illustrates an advanced stage of a manufacturing method for assembling a fiber optic lighting module.

FIG. 10 illustrates an advanced stage of the manufacturing process, where the fiber panels have unfolded until they are coplanar and the optical fibers are fully interwoven. At this point, bundle elements 1020a and 1020b may be attached near the end of each fiber bundles 1010a and 1010b, and light sources 1005a and 1005b may be attached to the end of each fiber bundles 1010a and 1010b.

Advantageously the embodiments described herein are particularly suited for exterior lighting and in environments where it is necessary that the lighting match or conform to the contour or styling of the vehicle.

This invention, including all embodiments shown and described herein, could be used alone or together and/or in combination with one or more of the features covered by one or more of the claims set forth herein, including but not limited to one or more of the features or steps mentioned in the Summary and the claims.

While the system, apparatus, process and method herein described may constitute preferred embodiments, it is to be understood that the implementation is not limited to this precise system, apparatus, process and method, and that changes may be made therein without departing from the scope which is defined in the appended claims.

The invention claimed is:

1. A fiber optic lighting module, comprising:
    a first fiber panel having a plurality of optical fibers arranged in a predetermined form and having at least some of the plurality of optical fibers extending outwardly from a light input edge of the first fiber panel to couple to a first light source;
    a second fiber panel having a plurality of optical fibers arranged in a predetermined form and having at least some of the plurality of optical fibers extending outwardly from a light input edge of the second fiber panel to couple to a second light source; and
    a transition region wherein the optical fibers extending from the first fiber panel are interwoven with the optical fibers extending from the second fiber panel such that the light input edge of the first fiber panel and the light input edge of the second fiber panel are positioned in proximity to one another,
    wherein the first fiber panel and the second fiber panel are mounted proximate to each other on a hinged fixture to interweave the optical fibers, and wherein the plurality of optical fibers from each fiber panel is directed in the same direction.

2. The fiber optic lighting module of claim 1, additionally comprising:
a first bundling element to bundle together ends of the optical fibers extending from the light input edge of the first fiber panel; and
a second bundling element to bundle together the ends of the optical fibers extending from the light input edge of the second fiber panel.

3. The fiber optic lighting module of claim 2, wherein the first light source is coupled into a bundled end of the optical fibers extending from the light input edge of the first fiber panel and the second light source is coupled into a bundled end of the optical fibers extending from the light input edge of the second fiber panel.

4. The fiber optic lighting module of claim 1, wherein the first light source and the second light source each include a solid state light emitter.

5. The fiber optic lighting module of claim 2, wherein the first bundling element and the second bundling element each include a ferrule configured to hold the optical fibers extending from each corresponding fiber panel in a bundle having a predetermined cross-sectional shape.

6. The fiber optic lighting module of claim 2, wherein the first bundling element and the second bundling element comprise adhesive configured to hold the optical fibers extending from each corresponding fiber panel in a bundle having a predetermined cross-sectional shape.

7. The fiber optic lighting module of claim 1, wherein each optical fiber extending from the light input edge of the first fiber panel is interwoven with one optical fiber extending from the light input edge of the second fiber panel.

8. The fiber optic lighting module of claim 1, wherein each optical fiber extending from the light input edge of the first fiber panel is interwoven with two or more optical fibers extending from the light input edge of the second fiber panel.

9. The fiber optic lighting module of claim 1, wherein each group of two or more optical fibers extending from the light input edge of the first fiber panel is interwoven with two or more optical fibers extending from the light input edge of the second fiber panel.

10. The fiber optic lighting module of claim 1, wherein the light input edge of the first fiber panel and the light input edge of the second fiber panel are positioned within 5 mm of one another.

11. The fiber optic lighting module of claim 1, wherein the light input edge of the first fiber panel and the light input edge of the second fiber panel are positioned within 2 mm of one another.

12. A method of manufacturing a fiber optic lighting module, comprising:
providing a first fiber panel having a front face, a back face, and a plurality of optical fibers arranged in a predetermined form and having at least some of the plurality of optical fibers extending outwardly from one edge of the first fiber panel;
providing a second fiber panel having a front face, a back face, and plurality of optical fibers arranged in a predetermined form and having at least some of the plurality of optical fibers extending outwardly from one edge the second fiber panel;
mounting the first fiber panel and the second fiber panel in a hinged fixture that holds the fiber panels with their front faces parallel and in proximity and with the plurality of optical fibers from each fiber panel directed in the same direction;
unfolding the fixture along a hinge line such that the plurality of optical fibers of the first fiber panel interweave with the plurality of optical fibers of the second fiber panel until the first fiber panel and the second fiber panel are coplanar;
applying a first bundling element to bundle together the ends of the optical fibers extending from the first fiber panel;
applying a second bundling element to bundle together the ends of the optical fibers extending from the second fiber panel;
attaching a first light source to a bundled end of the optical fibers extending from the first fiber panel; and
attaching a second light source to a bundled end of the optical fibers extending from the second fiber panel.

13. The method of claim 12, wherein the first light source and the second light source each include a solid state light emitter.

14. The method of claim 12, wherein the first bundling element and the second bundling element each include a ferrule configured to hold the optical fibers extending from each corresponding fiber panel in a bundle having a predetermined cross-sectional shape.

15. The method of claim 12, wherein the first bundling element and the second bundling element comprise adhesive configured to hold the optical fibers extending from each corresponding fiber panel in a bundle having a predetermined cross-sectional shape.

16. The method of claim 12, wherein each optical fiber extending from the first fiber panel is interwoven with one optical fiber extending from the second fiber panel.

17. The method of claim 12, wherein each optical fiber extending from the first fiber panel is interwoven with two or more optical fibers extending from the second fiber panel.

18. The method of claim 12, wherein each group of two or more optical fibers extending from the first fiber panel is interwoven with two or more optical fibers extending from the second fiber panel.

19. A vehicle taillight assembly comprising:
a taillight housing mountable on a rear corner of a vehicle;
a first fiber panel, mountable in the taillight housing, having a plurality of optical fibers arranged in a predetermined form and having at least some of the plurality of optical fibers extending outwardly from a light input edge of the first fiber panel to couple to a first light source;
a second fiber panel, mountable in the taillight housing, having a plurality of optical fibers arranged in a predetermined form and having at least some of the plurality of optical fibers extending outwardly from a light input edge the second fiber panel to couple to a second light source; and
a transition region wherein the optical fibers extending from the first fiber panel are interwoven with the optical fibers extending from the second fiber panel,
wherein the first light source and the second light source are mountable in an outboard location in the taillight housing such that light from the first light source and the second light source is directed toward an inboard location in the taillight housing, and
wherein the first fiber panel and the second fiber panel are mounted proximate to each other on a hinged fixture to interweave the optical fibers, and wherein the plurality of optical fibers from each fiber panel is directed in the same direction.

20. The vehicle taillight assembly of claim 19, wherein each optical fiber extending from the light input edge of the first fiber panel is interwoven with two or more optical fibers extending from the light input edge of the second fiber panel.

* * * * *